Oct. 25, 1966 E. L. STREB 3,281,015
STRUCTURE FOR METERING SUBSTANCES INTO TANKS
Filed Jan. 28, 1965

INVENTOR.
Ernest L. Streb
BY
Hovey, Schmidt, Johnson & Hovey
ATTORNEYS.

United States Patent Office 3,281,015
Patented Oct. 25, 1966

3,281,015
STRUCTURE FOR METERING SUBSTANCES INTO TANKS
Ernest L. Streb, Raymondville, Tex., assignor to Frontier Industries Inc., Raymondville, Tex., a corporation of Texas
Filed Jan. 28, 1965, Ser. No. 428,627
8 Claims. (Cl. 222—57)

This invention relates to fluid metering devices and, more particularly to an actuatable assembly for dispensing a measured amount of liquid each time the assembly is actuated.

The soil in many livestock grazing areas is oftentimes deficient in phosphoric acid, a substance which is a necessary part of livestock feed in order to maintain proper growth, milk production, a profitable calf crop, and the like. It has been found that deficiencies of this substance can be overcome by placing measured quantities of phosphoric acid into the livestock drinking water at specific locations in the grazing areas. The livestock is generally left unattended for several weeks at a time, the water supply therefor being provided by water which is periodically pumped from wells drilled in the ground at the grazing areas. A need has, therefore, arisen for liquid-dispensing apparatus which is operable under the aforesaid conditions and for the foregoing purpose.

The present invention provides liquid-dispensing apparatus which is suitable for use in directing measured amounts of a first liquid into a body of a second liquid adjacent thereto. The apparatus may be actuated by a flow of the second liquid into the main body of the liquid so that an additional source of power for actuating the apparatus is precluded. The apparatus will continue to operate so long as the liquid flow is maintained; hence, the apparatus will continue to operate unattended over a relatively long periods of time at least between the times when the grazing area with which the apparatus is associated is serviced.

It is, therefore, the primary object of the present invention to provide a liquid-dispensing assembly which is suitable for use in directing measured amounts of a liquid chemical substance into a livestock drinking tank and which will continue to operate efficiently even though it is serviced only at relatively infrequent intervals.

Another object of the instant invention is the provision of an assembly of the type described wherein the assembly is actuated in response to the flow of water into the tank whereby an additional source of power to operate the assembly is obviated and the cost of dispensing liquid from the assembly is thereby minimized.

A further object of the present invention is the provision of a liquid-dispensing assembly of the type described having a liquid-receiving member which can be adjusted in volume so that the quantity of a chemical substance dispensed thereby may be changed as desired without replacing or substantially modifying the assembly or any part thereof.

Yet another object of this invention is the provision of a liquid-dispensing assembly which is simple and rugged in construction, can withstand extremes of atmospheric weather, and can be produced and maintained at a relatively small cost.

The present invention provides a liquid dispensing assembly which is adapted to be mounted in an operative position above the liquid level in a liquid-receiving tank. The assembly includes a reservoir for containing a first liquid to be dispensed into the tank and has a tubular shaft journaled on a support for rotation about the generally horizontal axis. A tube, having a receptacle at one end thereof and a liquid-receiving member at the opposite end thereof, is secured intermediate its ends to the shaft for up-and-down movement as the shaft rotates with respect to the reservoir. The tube places the receptacle and the member in fluid communication with each other and the member is in fluid communication with the rotatable shaft. The receptacle moves from a first position below the liquid level in the reservoir to a second position above the member whereby the liquid in the receptacle moves through the tube and into the member. As the receptacle returns to its first position, the liquid in the member flows out of the latter into and through the shaft, the shaft having one of its open ends above the tank so that the measured liquid from the member will flow thereinto.

Means for rocking the shaft includes a compartmented device within the path of travel of a second liquid flowing into the tank. When one of the compartments of the device has received a certain quantity of the second liquid it will become unbalanced and rock in a direction to dump the second liquid carried thereby into the tank. This action rotates the shaft in one direction. A second compartment of the device then becomes partially filled with the second fluid until it becomes unbalanced, resulting in the rotation of the shaft in the opposite direction. As a result, metered amounts of the liquid in the reservoir are directed into the tank so long as the second liquid flows thereinto.

Figure 3:
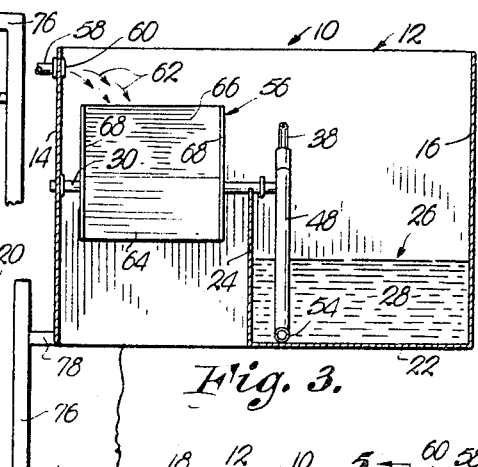
FIG. 3 is a cross-sectional view taken along line 3—3 of FIG. 2.

Liquid-dispensing assembly 10, having a support 12 in the nature of a rectangular framework, includes a pair of opposed sides 14 and 16 and a pair of opposed ends 18 and 20 in spanning relationship to sides 14 and 16. A bottom 22 interconnects side 16 and an intermediate panel 24 to form a reservoir 26 for a liquid 28 to be dispensed. Panel 24 spans the distance between ends 18 and 20 and has a height less than the height of sides 14 and 16 as shown in FIG. 3.

Figure 7:
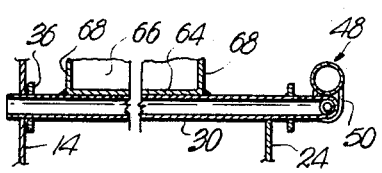
FIG. 7 is a cross-sectional view taken along line 7—7 of FIG. 6.

A tubular shaft 30 spans the distance between and is journaled for rotation with respect to side 14 and panel 24 as shown in FIG. 7. One end of shaft 30 extends through an opening 32 in side 14, whereas shaft 30 is supported adjacent the opposite end thereof in a notch 34 in the upper edge of panel 24. Opening 32 and notch 34 are in alignment with each other so that shaft 30 will rotate about a generally horizontal axis when assembly 10 is in an operative position. An annulus 36 is rigid to shaft 30 at the end thereof adjacent opening 32 to limit the lateral movement thereof outwardly of side 14.

The end of shaft 30 opposite to the end extending through opening 32 is integral with a liquid-receiving member 38 having a top, upwardly facing inlet opening 40 intermediate its ends and a tubular portion 42 intercommunicating shaft 30 and portion 40. Member 38 extends laterally from the proximal end of shaft 30 and has a closure 44 at the outer extremity thereof. An adjusting screw 46 is threadably mounted in closure 44 to permit variations in the volume of member 38.

Figure 6:
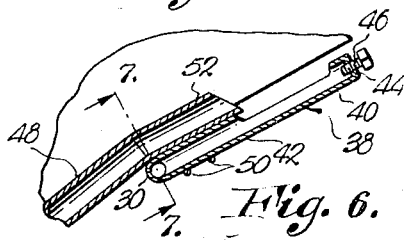
FIG. 6 is a cross-sectional view taken along line 6—6 of FIG. 1.

A tube 48 is secured adjacent one end thereof to member 38 by a pair of U-shaped devices 50 in a manner so that open outlet end 52 of tube 48 is in alignment with the open top of portion 40 as shown in FIG. 6. Tube 48 extends laterally from the proximal end of shaft 30 and has a tubular receptacle 54 at the outer end thereof, receptacle 54 being angularly disposed relative to the longitudinal axis of tube 48.

A compartmented, liquid-receiving unit 56 is rigidly secured to shaft 30 for rotating the latter in opposed directions in response to a liquid issuing from a pipe 58 coupled with side 14. Unit 56 is within the path of travel of the liquid as the same gravitates from the open end 60 of pipe 58, arrows 62 indicating the path of travel of the liquid as it gravitates toward the space between side 14 and panel 24.

Figure 2:
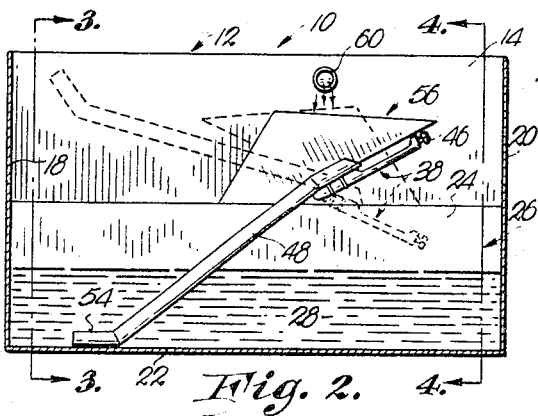
FIG. 2 is a cross-sectional view illustrating several movable components of the assembly and showing their dispositions when the same are moved.
Figure 5:
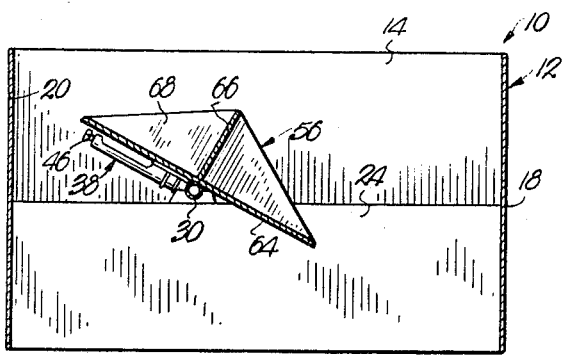
FIG. 5 is a cross-sectional view taken along line 5—5 of FIG. 4.

Unit 56 includes a bottom 64, an intermediate partition 66, and a pair of triangular sides 68 as shown in FIGS. 5 and 7, whereby to define a pair of liquid-receiving compartments 70 and 72. When tube 48 is in the full-line position of FIG. 2, compartment 72 is disposed to receive liquid from end 60 of pipe 58. Since shaft 30 is midway between the ends of bottom 64, unit 56 will become unbalanced as compartment 72 is filled with the liquid, thus causing unit 56 to rotate in a clockwise sense when viewing FIG. 2 to, in turn, elevate tube 48 to the dashed-line position of FIG. 2. Unit 56 will then assume a position shown in FIG. 5 and the liquid will drain from compartment 72 into the space between side 14 and panel 24. Compartment 70 will then be aligned with end 60 to receive liquid therefrom. As compartment 70 begins to receive the liquid, unit 56 will become unbalanced once again, causing rotation of shaft 30 in a counterclockwise sense when viewing FIG. 2 to, in turn, cause movement of tube 48 downwardly into the full-line position shown in FIG. 2.

Figure 4:
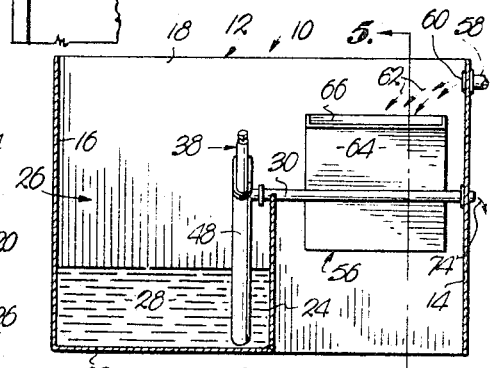
FIG. 4 is a cross-sectional view taken along line 4—4 of FIG. 2.

Tube 48 is of a length sufficient to cause a quantity of liquid 28 to be retained in receptacle 54 as shaft 30 rotates in a clockwise sense when viewing FIG. 2. This quantity of liquid will eventually flow through tube 48 and into member 38 through the open top of portion 40 as receptacle 54 moves from a position below the level of liquid 28 into a position above member 38. As receptacle 54 moves downwardly, the liquid in member 38 will also flow downwardly and into shaft 30 by way of portion 42. The liquid will continue to flow through shaft 30 and out of the open end thereof adjacent to side 14 along a path denoted by arrow 74 in FIG. 4.

Figure 1:
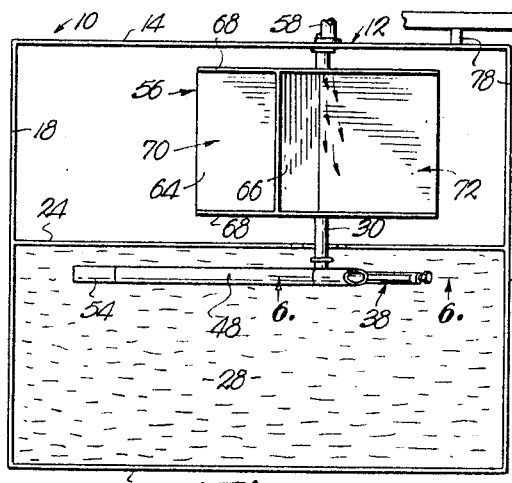
FIGURE 1 is a top plan view of the assembly disposed in an operative position above a water tank.

In operation, assembly 10 is adapted to be used with a tank 76 or other liquid-receiving apparatus which is disposed below pipe 58 to receive the liquid issuing from end 60 thereof. Tank 76 is shown fragmentarily in FIGS. 1 and 3, there being structure 78 for interconnecting assembly 10 and tank 76 so that the outer end of shaft 30 overlies the open top of tank 76 as shown in FIG. 3. Assembly 10 is especially suitable for use in dispensing metered amounts of phosphoric acid into livestock drinking water. In this case, water is the liquid passing through pipe 58 and gravitating into tank 76 along the path denoted by arrows 62. A quantity of liquid phosphoric acid is placed in reservoir 26 so that each time tube 48 makes a complete cycle of operation, a measured amount of the phosphoric acid will be deposited in tank 76.

With receptacle 54 in the horizontal position shown in FIG. 2, water will flow into compartment 72 of unit 56 until the latter becomes unbalanced. When this occurs, receptacle 54 will be lifted out of the phosphoric acid in reservoir 26 and will be moved into the dashed-line position shown in FIG. 2. The quantity of phosphoric acid will then flow through tube 48 and into member 38. The acid will be retained in closure 44 since receiver member 38 is sloping downwardly away from shaft 30, and excess phosphoric acid will overflow member 38 and return to reservoir 26, thus assuring no waste of the substance at any time.

As water continues to flow through pipe 58, it will flow into compartment 70 so long as tube 48 and receptacle 54 are in the dashed-line positions thereof shown in FIG. 2. As compartment 70 becomes unbalanced, shaft 30 will again be rotated in the opposite direction causing receptacle 54 to move into the liquid in receptacle 26 to the full-line position thereof shown in FIG. 2. When this occurs, receiver member 38 is sloping downwardly toward shaft 30 so that the quantity of the phosphoric acid in member 38 will flow downwardly and into shaft 30, whereupon the liquid will then pass out of the end of shaft 30 and gravitate into tank 76.

The volume of member 38 can be varied by adjusting screw 46 so that the concentration of the phosphoric acid in the water can be changed as desired. So long as water flows through pipe 58, the substance in reservoir 26 will be directed into tank 76 in measured amounts. If assembly 10 is to be used in an isolated livestock grazing area, and if water is pumped from a well into pipe 58, phosphoric acid may be added to the water in controlled amounts as the water is pumped into tank 76. Thus, the concentration of the phosphoric acid in the water remains substantially the same at all times so that the operation of adding this substance to the water is automatic to preclude the presence of personnel to accomplish the same. During periods when water is not directed into tank 76, there will be no phosphoric acid added to the water. Thus, the concentration of the mixture will never increase beyond the desired amount. Reservoir 26 may be of a volume sufficient to contain enough of the phosphoric acid to preclude having to replenish the same at frequent intervals. Preferably, reservoir 26 is of a volume such that it need be refilled only when the grazing area with which assembly 10 is associated is being serviced.

Having thus described the invention, what is claimed as new and desired to be secured by Letters Patent is:

1. A liquid-dispensing assembly for a liquid-receiving tank comprising:

a support having means for mounting the same on a liquid-receiving tank above the liquid level thereof;

a conduit coupled to said support and having an open end aligned with the tank for directing a liquid thereinto, said conduit adapted to be coupled to a source of a first liquid and to direct the same into the tank;

a tubular shaft journaled on said support below said open end of the conduit for rotation about a generally horizontal axis, one end of said shaft being open and disposed above and in alignment with said tank, whereby a liquid flowing out of said open end of the shaft will gravitate into the tank;

a tube secured intermediate its ends thereof to the shaft adjacent to the opposite end of the latter for rotation therewith in opposed directions, said tube extending laterally from said shaft and being movable in a substantially vertical plane;

a reservoir secured to said support and disposed below the opposite end of the shaft, said reservoir being adapted to contain a second liquid therein, the vertical plane of movement of said tube passing through said reservoir;

a receptacle secured to and in fluid communication with one end of said tube for vertical movement therewith, said tube being movable from a first position below the liquid level of said reservoir to a second position about said shaft to thereby raise a quantity of said second liquid therewith, the opposite end of said tube being open to define an outlet;

an open top liquid-receiving member secured to said tube adjacent the outlet end of the latter with the outlet end of the tube being above and aligned with the open top of the member, said member being movable from a first location above the shaft to a second location below the shaft as the receptacle moves from said first position to said second position, said tube being disposed to direct said quantity of liquid raised by said receptacle toward and into said member as the latter moves toward and into said location, said member being in fluid communication with said shaft and disposed for directing the liquid received therein into the shaft as the member returns to said first location as said receptacle returns to said first position, whereby the liquid will pass through said shaft and out of the latter through said open end thereof into said tank; and an actuating device secured to said shaft for rotating the latter in opposed directions and thereby moving said receptacle from said first position into said second position and return in response to the flow of said first liquid from said open end of the conduit into said tank, said device having a pair of compartments movable alternately into the path of said first liquid as the same gravitates from said conduit, each compartment adapted to be filled to a predetermined level and disposed to unbalance the device sufficiently to cause rotation of the latter and thereby said shaft in a corresponding direction as said first liquid reaches said predetermined level therein.

2. For use with a liquid reservoir, an assembly for dispensing the liquid from the reservoir, said assembly comprising:
   a support;
   a tubular shaft;
   means mounting said shaft on said support for rotation about a horizontal axis above the liquid level of the reservoir;
   a tubular receiver extending laterally from the shaft and having a closed end remote from the shaft, said receiver communicating with the shaft at the opposite end of the receiver,
   said receiver having a top, upwardly-facing inlet opening intermediate its ends; and
   an elongated tube crossing the shaft above the receiver and secured to the shaft for rotation therewith,
   said tube having a fill position inclined downwardly from the shaft, and a discharge position inclined upwardly from the shaft,
   said receiver sloping downwardly away from the shaft when the tube is in said discharge position,
   said tube having means at one end thereof disposed in said liquid when the tube is in said fill position for receiving a quantity of the liquid,
   said tube having an open outlet end above said receiver inlet opening for flow of said quantity of liquid therefrom into the receiver when the tube is in said discharge position,
   said receiver sloping downwardly toward the shaft when the tube is in said fill position for flow of said quantity of liquid from the receiver into the shaft.

3. A liquid-dispensing assembly as set forth in claim 2, said receiving means at one end of the tube comprising an angularly disposed portion of the tube, the portion being open at the extremity thereof to receive said liquid while the tube is in said fill position.

4. A liquid-dispensing assembly as set forth in claim 3, said portion being substantially horizontal when in said fill position.

5. A liquid-dispensing assembly as set forth in claim 2, there being means on the receiver adjacent the closed end thereof for varying the capacity of said member.

6. A liquid-dispensing assembly as set forth in claim 5, said varying means including a screw threadably mounted on the member for movement into and out of the same.

7. A liquid-dispensing assembly as set forth in claim 2, wherein is provided means on said shaft responsive to the flow of a second liquid for oscillating said shaft in opposed directions to said fill and discharge positions.

8. A liquid-dispensing assembly as set forth in claim 7, wherein said oscillating means includes a unit having a pair of receiving compartments disposed to receive said second liquid and to unbalance the unit and thereby rotate the same each time the compartments receive a predetermined quantity of the second liquid.

References Cited by the Examiner

UNITED STATES PATENTS 1,575,433    3/1957    Litchtenthaeler _____ 222—57

FOREIGN PATENTS 31,835    5/1923    Denmark.
177,614    4/1922    Great Britain.

ROBERT B. REEVES, *Primary Examiner.*

H. S. LANE, *Examiner.*